United States Patent Office 2,844,596
Patented July 22, 1958

2,844,596
DIPHTHALIDES

Donald D. Wheeler and David C. Young, Midland, Mich., assignors to The Dow Chemical Company, Midland, Mich., a corporation of Delaware No Drawing. Application July 5, 1956
Serial No. 595,845

6 Claims. (Cl. 260—343.3)

This invention is concerned with diphthalides having the formula

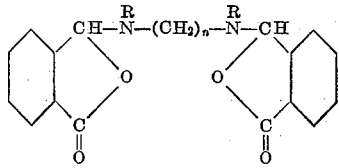

In this and succeeding formulae, R represents a hydrogen, aryl, alkyl or aralkyl radical and $n$ is an integer of from 2 to 6, inclusive. The preferred alkyl radicals are lower alkyl radicals containing from 1 to 5 carbon atoms, inclusive. The term "aralkyl" is inclusive of radicals such as benzyl and 2-phenyl-ethyl, as well as those containing substituents in the aromatic ring such as o-hydroxybenzyl and m-nitrobenzyl.

The term "aryl" as herein employed refers to aromatic radicals of the benzene series and is inclusive of phenyl and substituted phenyl such as p-nitrophenyl, p-tolyl and m-chlorophenyl.

The new compounds are light colored crystalline solids somewhat soluble in polar organic solvents such as acetone and ethanol, and substantially insoluble in water and petroleum ether. These compounds exhibit antimicrobial activity and are adapted to be employed as toxic constituents in compositions where inhibition of microbial growth is desired as in disinfectants and agricultural fungicides.

The above compounds may be prepared by causing phthalaldehydic to react with a diamine having the formula

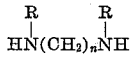

wherein R and $n$ are as above specified, to produce the desired phthalide and water of reaction. The terms "phthalaldehydic acid" and "3-hydroxyphthalide" refer to a compound having the structure

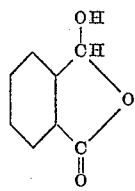

Phthalaldehydic acid is often represented in the literature as having the structure

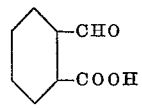

However, the acid employed in this invention and prepared as hereinafter described is almost entirely of the 3-hydroxyphthalide ring structure as indicated by its infrared absorption spectrum. Infrared data also indicate the phthalide products to have the ring structure.

The reaction for the preparation of the new compounds takes place readily in the temperature range of from 20° to 100° C. For the preparation of phthalides derived from secondary amines, temperatures up to 150° C. may be employed. It is preferably carried out in an inert solvent as reaction medium. Suitable solvents include acetone, benzene, butanone, water and alcohol. Good results are obtained when substantially equivalent proportions of the reactants are employed, however, a reasonable excess of either reactant does not interfere with the reaction. A large excess of phthalaldehydic acid, particularly at elevated temperatures, may form an anhydride by-product.

In one method of carrying out the reaction, phthalaldehydic acid and the amine are dissolved in or mixed with the reaction solvent. Mixing of the reactants and solvent usually results in the development of heat of reaction. The resulting mixture is heated for a period of from a few minutes to four hours during which time the desired phthalide product usually precipitates in the reaction mixture. After completion of the heating period, the mixture is allowed to cool and the phthalide product, if a solid, is separated therefrom by filtration. The product may be purified, if desired, by washing and drying. Recrystallization is not generally employed for purification since many of the compounds are heat-sensitive. The product, if a liquid, is recovered from the mixture by heating the latter, preferably under reduced pressure, to distill off the solvent and water of reaction, and obtain the product as a residue.

In an alternative method for carrying out the reaction, phthalaldehydic acid and the appropriate amine are mixed in a solvent such as benzene capable of forming azeotropic mixtures with water. The mixing step is usually accompanied by heat of reaction and sometimes by a precipitation of the product. The resulting mixture is heated for a period of from 0.5 to 2 hours to complete the formation of the phthalide product. The pressure is reduced during the heating period to about 15 millimeters and the water of reaction distilled therefrom as a benzene-water azeotrope in the temperature range of from 30° to 50° C. Remaining solvent is also separated by distillation and the phthalide product recovered as residue.

The following examples illustrate the invention but are not to be construed as limiting.

*Example 1.—3,3'-(ethylenebis(2-hydroxybenzylimino))
diphthalide*

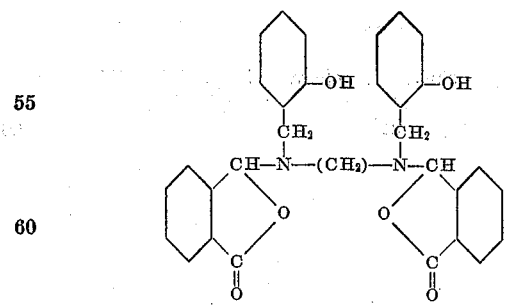

27.2 grams (0.1 mole) of α,α'-ethylenediimino-di-o-cresol, 30 grams (0.2 mole) of phthalaldehydic acid and 150 milliliters of benzene were mixed and heated. An amber colored oil precipitated from the mixture and the latter was heated for an additional 2 hours to distill out the benzene. About 100 milliliters of acetone was added to dissolve the residue and the acetone allowed to evaporate therefrom under a stream of air. As the solvent evaporated, a solid 3,3'-(ethylenebis(2-hydroxybenzylimino))diphthalide product slowly precipitated. The mixture was then cooled and the product separated therefrom by filtration. The precipitate was washed with acetone to recover a purified product melting at 200° to 201° C.

The above product is useful as a germicide adapted to be employed for the control of bacterial organisms. For example, a solid nutrient agar medium saturated with 3,3' - (ethylenebis(2 - hydroxybenzylimino))diphthalide gave complete inhibition of growth when streaked with *Staphylococcus aureus* and incubated at 30° C. for three days.

*Example 2.—3,3'-(ethylenebis(benzylimino))diphthalide*

36 grams (0.15 mole) of N,N'-dibenzylethylenediamine, 45 grams (0.3 mole) of phthalaldehydic acid and 100 milliliters of acetone were mixed and the resulting solution heated on the steam bath for one hour to evaporate off the major portion of the acetone. At the end of this period, the mixture was cooled whereupon a solid product precipitated. The latter was recovered by filtration and washed with acetone to obtain a purified 3,3'-(ethylenebis-(benzylimino))diphthalide product melting at 172–173° C.

*Example 3.—3,3'-(ethylenebis(butylimino))diphthalide*

25.8 grams (0.15 mole) of N,N'-dibutylethylenediamine, and 45 grams (0.3 mole) of phthalaldehydic acid were dissolved in 100 milliliters of acetone and the resulting solution heated on the steam bath for one hour. Some of the acetone evaporated during the heating process and a solid precipitated from the solution. The mixture was then allowed to cool and the solid removed by filtration and washed with acetone to obtain a 3,3'-(ethylenebis (butylimino))diphthalide product melting at 152°–152.5° C.

The product has antimicrobial properties useful for the control of bacterial organisms. For example, a solid nutrient agar medium saturated with 3,3'-(ethylenebis(butylimino))diphthalide gave complete inhibition of growth when streaked with *Salmonella typhosa* and incubated at 30° C. for three days.

*Example 4.—3,3'-(ethylenebis(phenylimino))diphthalide*

A solution of 25 grams (about 0.1 mole) crude N,N'-diphenylethylenediamine in 100 milliliters of acetone and a solution of 30 grams (0.2 mole) of phthalaldehydic acid in 50 milliliters of acetone were mixed together. The mixture was heated together over a period of 0.5 hour on the steam bath to evaporate off a portion of the acetone. The mixture was then allowed to cool to precipitate a 3,3'-(N,N'-diphenylethylenediimino)diphthalide product. The precipitate was washed several times with acetone and dried at about 60° C. and 15 millimeters' pressure to recover a purified product melting at 233°–235° C.

In similar preparations, the following diphthalides are prepared:

3,3'-(ethylenebis(3-nitrophenylimino))diphthalide by the reaction of N,N'-bis(3-nitrophenyl)ethylenediamine and phthalaldehydic acid.

3,3'-(ethylenebis(4-ethylphenylimino))diphthalide by the reaction of N,N'-bis(4-ethylphenyl)ethylenediamine and phthalaldehydic acid.

3,3'-(ethylenebis(normal-pentylimino))diphthalide by the reaction of N,N'-di-normal-pentylethylenediamine and phthalaldehydic acid.

3,3'-(ethylenebis(methylimino))diphthalide by the reaction of N,N'-dimethylethylenediamine.

3,3'-(ethylenediimino)diphthalide by the reaction of ethylenediamine and phthalaldehydic acid.

3,3'-(hexamethylenediimino)diphthalide by the reaction of hexamethylenediamine and phthalaldehydic acid.

The phthalaldehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with aqueous constant-boiling hydrochloric acid in ferric chloride solution to obtain phthalaldehydic acid as more fully disclosed in U. S. Patent 2,748,162.

We claim:

1. A diphthalide having the formula

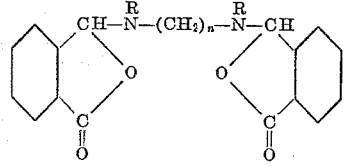

wherein R represents a member of the group consisting of hydrogen, alkyl, aryl and aralkyl, and $n$ is an integer of from 2 to 6, inclusive.

2. 3,3-(ethylenebis(phenylimino))diphthalide.

3. 3,3'-(ethylenebis (2-hydroxybenzylimino))diphthalide.

4. 3,3'-(ethylenebis(benzylimino))diphthalide.

5. 3,3'-(ethylenebis(butylimino))diphthalide.

6. A method for preparing a diphthalide having the formula

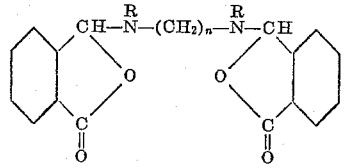

wherein R represents a member of the group consisting of hydrogen, alkyl, aryl and aralkyl, and $n$ is an integer of from 2 to 6, inclusive, which comprises the step of mixing phthalaldehydic acid and a diamine having the formula

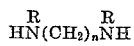

wherein R and $n$ are as above defined and maintaining the mixture at a temperature range of from 20° to 100° C. for a time sufficient to allow completion of the reaction.

No references cited.